Dec. 16, 1930.  E. ZUCKERBERG  1,785,401
GLASS ORNAMENTATION
Filed Nov. 6, 1929

INVENTOR.
Emanuel Zuckerberg.
BY Barlow & Barlow
ATTORNEYS.

Patented Dec. 16, 1930

1,785,401

UNITED STATES PATENT OFFICE

EMANUEL ZUCKERBERG, OF PROVIDENCE, RHODE ISLAND

GLASS ORNAMENTATION

Application filed November 6, 1929. Serial No. 405,205.

My present invention relates to glass ornamentation, and has particular reference to decorative grooves for plate and sheet glass and the like.

One object of the invention is to provide a decorative stripe or groove of pleasing shape and width for sheet glass, which will be shallow and will not unduly weaken the glass.

Another object is to provide grooves in a sheet of glass which simulate the appearance of muntins or cross bars and thus render the glass suitable for use in French doors and windows, at the same time eliminating objectionable projections from the plane of the glass which interfere with cleaning.

A further object is to provide a convex groove in glass sheets with side walls so shaped as to throw a shadow on the convex surface.

With these and other objects and advantageous features in view, the invention consists of novel arrangements of parts more fully disclosed in the detailed description following, in conjunction with the accompanying drawings, and more particularly set forth in the appended claims.

Figure 1:
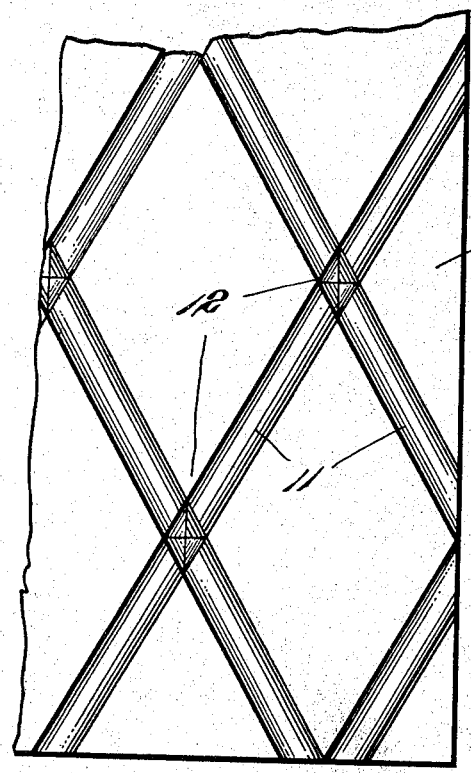
Fig. 1 is a plan view showing a glass sheet with the novel decorative grooves diagonally disposed thereof.

It has been found desirable in glass ornamentation to decorate the surface of glass sheets with grooves which may either be polished, or may be left unpolished to present a pleasing gray appearance. I have devised a novel groove which presents an attractive appearance, which is shallow, thus minimizing weakening of the glass sheet, and which includes a central domed or convex portion and inclined side walls, the side walls casting pleasing shadows on the central convex portion, whereby the grooves may be used to simulate muntins or the like while presenting surfaces easy to clean; and I have devised a novel glass grooving tool for producing the novel groove; and the following is a detailed description of a specific formation of grooves and of the tool therefor, in accordance with the principles of my invention.

Referring to the drawings, a sheet of glass 10, which may be plate or sheet glass such as is used for windows, doors, or mirrors, is provided with a plurality of spaced grooves 11, which may intersect at points 12. Each groove 11 includes a central convex portion 13, preferably an arc of a circle in cross section, and inclined side walls 14, extending from the extremities of the curved portion to the plane of the glass, and preferably at an angle of approximately 45 degrees thereto.

Figure 3:
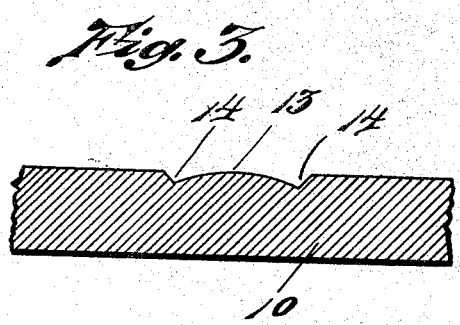
Fig. 3 is an enlarged cross-section of the novel grooves showing the inclined side walls.

As will be particularly noted from Figure 3, the novel groove is wide but is relatively very shallow, the central convex portion rising substantially to the surface of the glass. The novel groove therefore comprises a convex arcuate center portion and diverging side portions which extend from the ends of the arc to the plane of the face of the glass. The side walls are inclined outwardly so as to cast shadows on the convex portion, thus increasing the attractive appearance of the groove.

Figure 2:
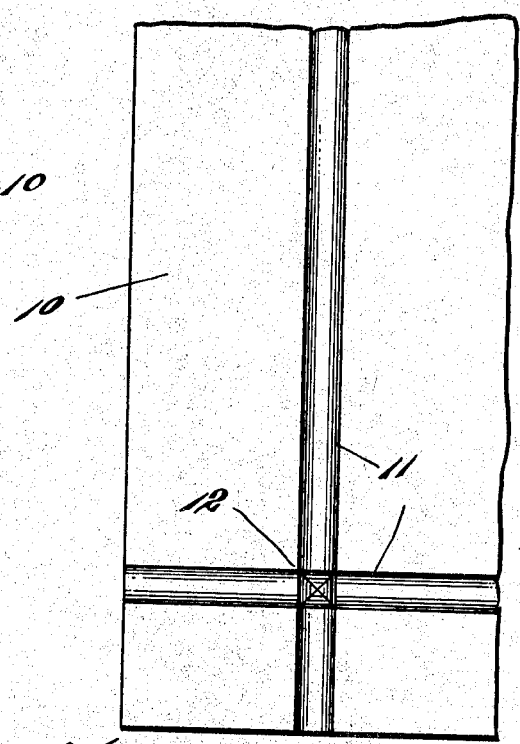
Fig. 2 is a similar plan view showing the novel grooves used as a border.

As will be noted from Figures 1 and 2, the intersection of two grooves forms a pleasing pyramidal figure at the point of intersection which adds to the attractiveness of the ornamentation.

The novel groove may be used in ornamenting sheet glass suitable for French doors and windows or the like, and when so used is preferably left unpolished to better simulate the appearance of muntins; the unbroken glass surface on one side, and the shallow grooves on the other side, facilitate the cleaning of glass sheets so used.

When ornamenting glass having a rough surface texture, it is found desirable, in certain instances, to limit the depth of cutting movement of the tool, thus forming two parallel grooved portions with an uncut glass section between. This ornamentation is very effective for pebbled glass or glass having an otherwise roughened or figured surface.

Figure 4:
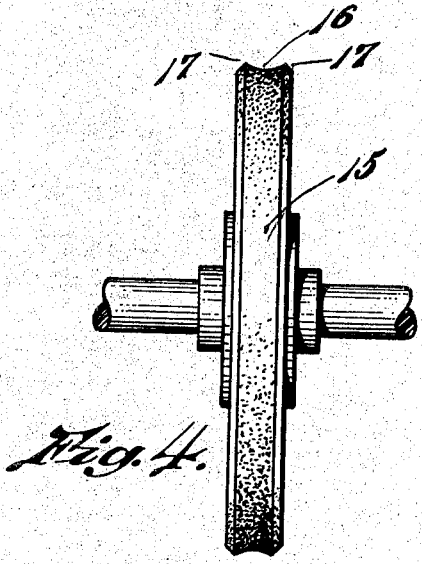
Fig. 4 is an elevation of the novel groove-cutting tool.

I have devised a novel form of rotatable cutting tool designated as 15 in Figure 4, which has its cylindrical cutting surface formed with a central concave cutting groove 16 and two inclined cutting faces 17 which recede from the ends of the central groove towards the axis of the tool.

While I have described a specific form of the novel groove and of the cutting tool for producing the novel groove, changes in the form and the dimensions of the groove and the tool may obviously be made, within the spirit and the scope of my invention as defined in the appended claims.

I claim:

1. Ornamentation for glass comprising a plurality of spaced grooves in one face thereof, the bottom wall of each groove being convex, and side walls intersecting said bottom wall and diverging therefrom to the plane of said face.

2. Ornamentation for glass comprising a plurality of spaced intersecting grooves in one face thereof, the bottom wall of each groove being convex, and side walls intersecting said bottom wall and diverging therefrom to the plane of said face.

3. Ornamentation for glass comprising a plurality of spaced grooves in one face thereof, the bottom wall of each groove being convex and rising substantially to the plane of said face, and side walls intersecting said bottom wall and diverging therefrom at an angle of substantially 45 degrees to the plane of said face.

4. Ornamentation for glass comprising a plurality of spaced intersecting grooves in one face thereof, the bottom wall of each groove being convex and rising substantially to the plane of said face, and side walls intersecting said bottom wall and diverging therefrom at an angle of substantially 45 degrees to the plane of said face, said grooves being unpolished to present a gray appearance.

5. Ornamentation for a glass body including a plurality of spaced grooves in one face thereof, the cross section of each groove having a convex center portion formed on the arc of a circle, and diverging side portions extending from the ends of said arc to the plane of said face.

6. An ornamental stripe for a glass body comprising spaced parallel groove portions formed by side walls converging inwardly from the surface and by arcuate portions intersecting the side walls and converging outwardly towards the surface and towards each other.

7. Ornamentation for a glass body comprising spaced intersecting grooves on the face thereof having convex bottom walls and inclined side walls diverging from the bottom walls towards the said face, the grooves forming pyramidal ornamentations at their points of intersection.

8. A glass panel provided on one face thereof with ornamental grooves having convex bottom walls and diverging side walls.

9. A glass panel provided on one face thereof with spaced intersecting ornamental grooves having convex bottom walls and diverging side walls.

In testimony whereof I affix my signature.

EMANUEL ZUCKERBERG.